Aug. 12, 1947.                H. A. STORCH                 2,425,654
                         VIBRATION DAMPENING DEVICE
                          Filed Sept. 17, 1943            2 Sheets-Sheet 1

INVENTOR.
HAROLD A. STORCH
BY
Kwis Hudson Brighton & Williams
ATTORNEYS

Aug. 12, 1947.                H. A. STORCH                    2,425,654
                          VIBRATION DAMPENING DEVICE
                           Filed Sept. 17, 1943          2 Sheets-Sheet 2

INVENTOR.
HAROLD A. STORCH
BY
Kwis Hudson Boughton & Williams
ATTORNEYS

Patented Aug. 12, 1947

2,425,654

UNITED STATES PATENT OFFICE 2,425,654

VIBRATION DAMPENING DEVICE

Harold A. Storch, Fairview Village, Ohio, assignor, by mesne assignments, to Harris Products Company, Cleveland, Ohio, a corporation of Ohio Application September 17, 1943, Serial No. 502,777

5 Claims. (Cl. 248—358)

This invention relates to flexible mounting or connecting devices for absorbing shocks and vibrations, and aims to provide an improved structure of this kind which is more efficient and satisfactory than similar devices heretofore used.

Another object of this invention is to provide an improved vibration dampener of the kind embodying a resilient ring and in which novel means is employed for strengthening and stiffening certain portions of the ring.

Still another object of the invention is to provide a novel form of vibration dampener embodying a resilient member and a universal joint.

A further object of the invention is to provide a vibration dampener of the kind embodying a resilient member and in which the vibrations to be absorbed are transmitted to the resilient member through a friction coupling.

The invention may be further briefly summarized as consisting in certain novel combinations and arrangements of parts hereinafter described and particularly set out in the appended claims.

In the accompanying sheets of drawings

Figure 1:
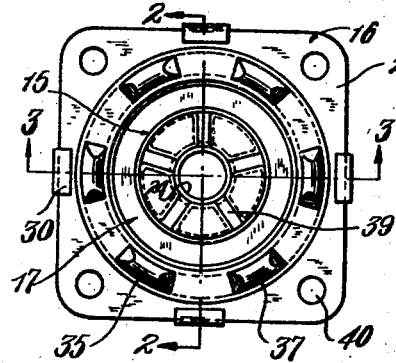
Fig. 1 is a plan view of a vibration dampener constructed according to the present invention.
Figure 2:
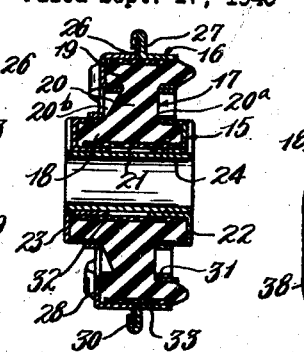
Fig. 2 is a sectional view thereof taken on line 2—2 of Fig. 1.
Figure 4:
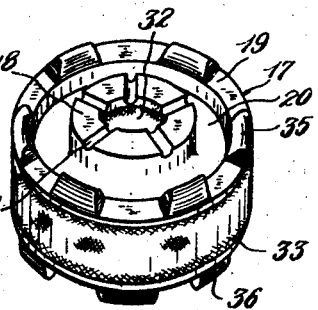
Fig. 4 is a perspective view showing the resilient ring in detached relation.
Figure 3:
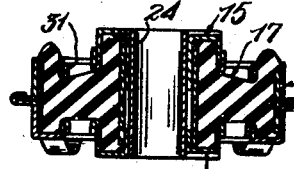
Fig. 3 is another sectional view taken on line 3—3 of Fig. 1.

The flexible devices which I have illustrated in the accompanying drawings can be used for various purposes where a flexible connection or mounting device is needed for absorbing shocks and vibrations. These devices are especially suitable for use as vibration dampeners in mounting instruments or the like in aircraft. The vibration dampeners herein disclosed are improvements over the vibration dampener disclosed in copending application Serial No. 475,065, filed February 8, 1943, now Patent No. 2,353,945, granted July 18, 1944.

In the embodiment of the invention illustrated in Figs. 1 to 4 inclusive I show my vibration dampener as comprising a pair of substantially co-axially disposed inner and outer members 15 and 16, and a resilient ring 17 forming a flexible connection between such members. This ring effectively absorbs shocks and vibrations and permits relative axial lateral and tilting movements between the members 15 and 16 which are connected thereby. The resilient ring 17 is preferably formed of soft-vulcanized rubber, but can also be formed of any suitable material having characteristics similar to rubber. The ring is molded to the desired shape and, as shown in the drawings, has axially thickened inner and outer continuous annular rim portions 18 and 19 which are integrally connected by a continuous annular web portion 20. The thickened inner portion 18 has a central opening 21 therethrough and this portion of the ring may also be referred to as a hollow stem portion.

The inner member 15 which is the load-carrying member, comprises a pair of cup-shaped sheet metal members 22 and 23 which telescope over the ends of the central rim or stem portion 18 of the resilient ring 17 and are connected with each other by an axial tube 24 extending through the opening 21. The members 22 and 23 may be pressed onto the tube 24 or may be connected therewith in any other suitable manner. By mounting the cup members 22 and 23 on the tube 24 as just described, the inner member 15 formed by these parts will be connected with the inner rim or stem portion of the ring 17.

The outer or supporting member 16 comprises a pair of sheet metal plates 26 and 27 disposed in face-to-face relation and having annularly grooved portions 28 which confine and grip the outer rim portion 19 of the ring 17. The plates 26 and 27 may be connected with each other in such face-to-face relation as by welding, or preferably, by means of the clamping lugs or ears 30 shown in the drawings. The parts forming the inner and outer members 15 and 16 have folded or doubled portions 31 thereon which provide smooth edges or beads for engagement with the rubber ring to avoid cutting or chafing thereof.

An important feature of the present invention is the provision of a reinforcing or stiffening medium in the axially thickened portions 18 and 19 of the resilient ring 17. This reinforcing means is preferably in the form of non-metallic fabric and may comprise a sleeve formed of one or more plies or layers of such fabric. In the drawings I show the inner rim or stem portion 18 as having such a reinforcing fabric sleeve 32 embedded therein, so as to lie at or adjacent the inner surface of the axial opening 21. Likewise I show the outer rim portion 19 as having such a fabric sleeve 33 embedded therein and lying at or adjacent the outer face thereof. The fabric sleeves 32 and 33 are preferably preformed, as by winding the fabric on a mandrel, and are then placed in the mold in which the resilient ring 17 is molded and cured. During the molding and curing operation the fabric sleeves are embedded in the rubber and become integrally bonded or united therewith. These fabric sleeves serve as a reinforcing medium and impart a desired stiffness to the thickened rim portions 18 and 19 and enable the same to be firmly gripped and held by the inner and outer members 15 and 16 while the connecting web portion 20 retains a high degree of resiliency and flexibility. By thus increasing the strength and stiffness of the rim portions 18 and 19, these fabric sleeves prevent such rim portions from being withdrawn or torn loose from the inner and outer members 15 and 16 and result in a very strong and durable connection being formed between these members and the ring 17.

Figure 5:
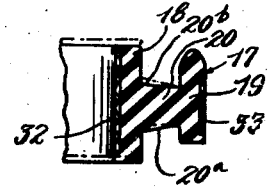
Fig. 5 is a partial transverse sectional view, somewhat diagrammatic in form, taken through the connecting ring and showing deflection thereof under load.

As shown in the drawings, the annular web portion 20 of the resilient ring 17 is preferably shaped such that while the device is in an unloaded condition, the lower face 20a thereof is substantially flat and lies in a transverse plane which is normal to the axis of the device. The other face 20b is beveled or sloped so that it converges toward the face 20a as the outer rim portion 19 is approached. When an instrument or other load is secured on the inner member 15, the latter will be displaced axially relative to the outer member 16 and the web portion 20 will assume a cross-sectional shape on the order of that illustrated in Fig. 5. In other words, when the device is placed under load, the web portion 20 will be deflected and will assume a substantially "keystone" shape as shown in full lines in Fig. 5 and which is highly desirable for maximum strength and for maximum efficiency in the absorption of shocks and vibrations.

In forming the resilient ring 17 it is preferably provided with a plurality of integral axial extensions 35 and 36 on the end face of the thickened rim portion 19 and the extensions 35 may be in a staggered or offset relation to the extension 36. These axial extensions serve as bumper elements for limiting the relative axial and rocking movements between the inner and outer members 15 and 16 when the device is in service. The purpose and function of such bumper elements is more fully disclosed in said copending application. When the extensions 35 and 36 are used on the resilient ring 17, the annularly grooved portions 28 of the plates 26 and 27 are provided with correspondingly spaced openings 37 through which the extensions extend. These axial extensions also serve as a means for additionally locking the resilient ring 17 to the plates 26 and 27 and for preventing relative creeping between the resilient ring and the outer member 16.

The cup members 22 and 23 have reinforcing ribs 38 formed in the bottom walls thereof. The end faces of the thickened inner rim or hollow stem 18 can be provided with radial grooves 39 which, when provided, correspond in location with the ribs 38 so as to receive the latter therein. The engagement of the ribs 38 in the grooves 39 affords a stronger connection between the inner member 15 and the resilient ring 17 and prevents relative annular shifting or creeping therebetween.

In using the above described device as a vibration dampener, a plurality of the devices are employed and the outer member 16 is connected with a support as by means of bolts (not shown) extending through the openings 40, and the instrument or other load to be supported is connected with the inner member 15 as by means of a bolt (not shown) extending through the tube 24. It will be understood, of course, that this arrangement can be reversed.

Figs. 6 to 10 inclusive show another form of my vibration dampener in which the outer member 41 is of a different construction and comprises a hollow base or bracket 42 and a clamping ring 43 connected therewith. The resilient ring 44 and the inner member 45 are substantially identical in construction with the corresponding members 16 and 17 of Fig. 2 and need not be further described in detail. In this form of the device, the end wall 46 of the base 42 has an annular groove 47 formed therein which cooperates with a similar annular groove formed in the clamping ring 43 in receiving and holding the thickened outer rim portion 48 of the resilient ring 17.

The clamping ring 43 can be connected with the base 42 by any suitable means such as the lugs or ears 49. When the resilient ring 44 is provided with the axial extensions or bumper elements 50, the parts 42 and 43 have correspondingly located slots or openings 51 through which such extensions project.

Figure 6:
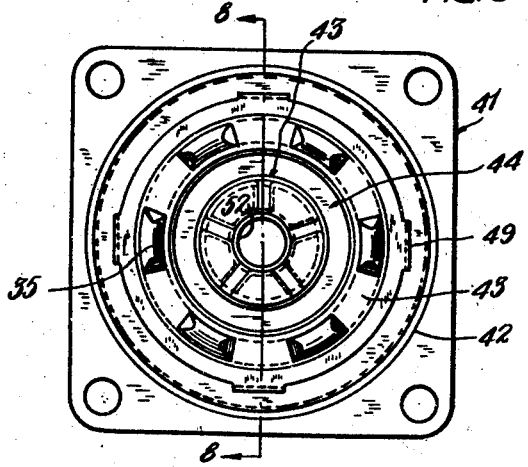
Fig. 6 is a plan view of another vibration dampener constructed according to the present invention.
Figure 8:
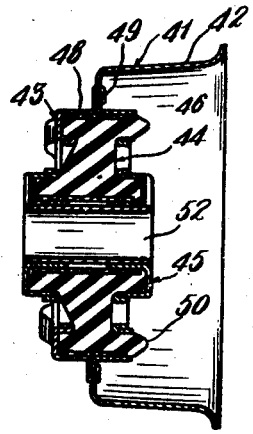
Fig. 8 is a sectional view taken through the device on line 8—8 of Fig. 6.
Figure 7:
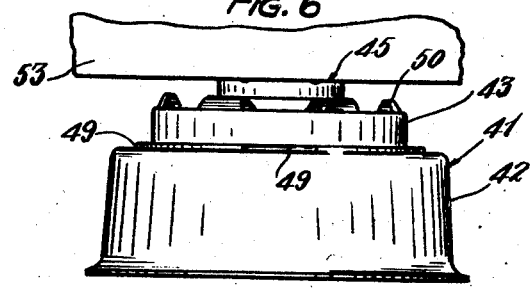
Fig. 7 is a side elevation thereof.

In using the vibration dampener of Fig. 6 for mounting an instrument 53 or the like, the base 42 is bolted or otherwise connected with the support and the instrument is connected with the inner member 45 by a bolt (not shown) extending through the central opening 52.

Figure 11:
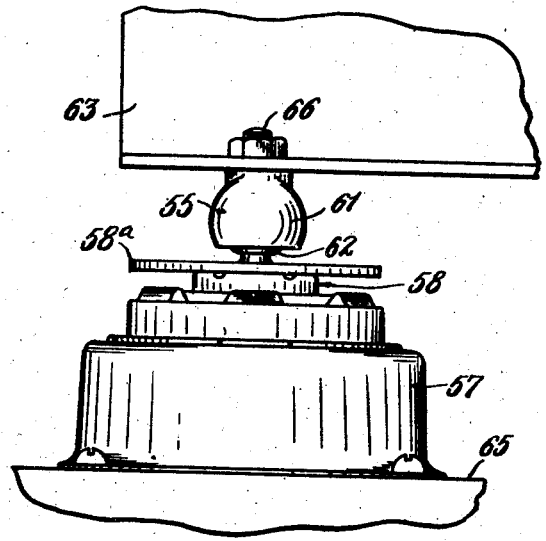
Fig. 11 is a side elevation showing still another vibration dampener constructed according to the present invention.
Figure 12:
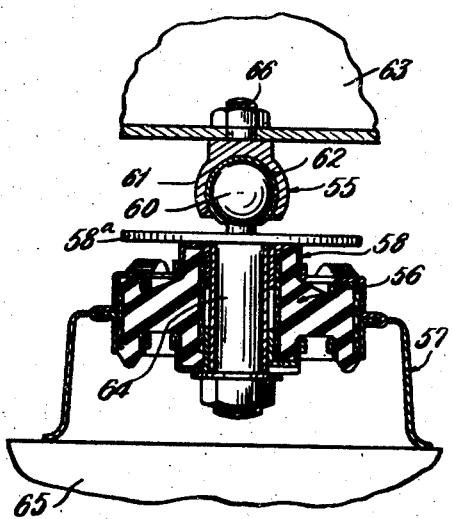
Fig. 12 is a longitudinal sectional view thereof.
Figure 9:
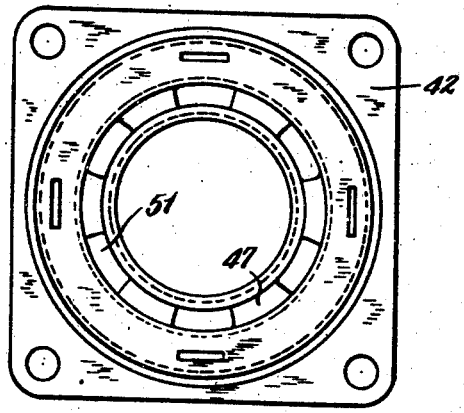
Fig. 9 is a plan view showing the bracket portion or base in detached relation.
Figure 10:
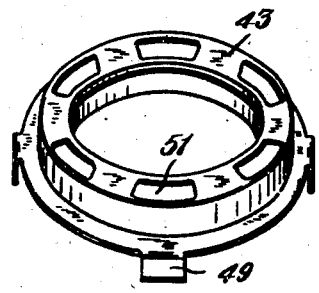
Fig. 10 is a perspective view showing the clamping ring in detached relation.

In Figs. 11 and 12 I show still another form of my vibration dampener which is similar to the vibration dampener shown in Figs 6 to 10 but which also include a friction coupling 55 through which the instrument or load is supported on the member 58, having a bumper disk 58a thereon. In this form of my device the hollow base 57 and the inner member 58, which are flexibly connected by the resilient ring 56, may be substantially identical in construction with the corresponding members 41 and 45 of the vibration dampener shown in Fig. 6, or the construction of Figs. 1 to 5 may be used. Likewise the resilient ring 56 may be identical in construction with the resilient rings 17 and 44 described above.

The friction coupling 55 is preferably in the form of a universal joint and may comprise ball and socket elements 60 and 61 and a friction element or lining 62 disposed therebetween. The friction element 62 may be any suitable friction material or, if desired, it can be a friction surface integrally formed on one or both of the elements 60 and 61. The friction element 62 serves to retard relative rocking between the ball and socket elements 60 and 61 and thus absorbs and dissipates some of the shocks and vibrations which would otherwise be transmitted to the instrument supported. By a friction element or surface as herein described, I mean an element or surface having a considerably higher coefficient of friction than would obtain if the ball and socket elements had ordinary bearing surfaces. The use of a friction element or surface in the flexible coupling or universal joint can be dispensed with, if desired.

The vibration dampener shown in Figs 11 and 12 can be used for various purposes, for example, several of these devices can be used in mounting a radio or other instrument 63 and when so employed will effectively absorb shocks and vibrations due to relative lateral shifting or jarring of the instrument as well as shocks and vibrations delivered to the vibration dampeners in a substantially axial direction. In the drawings I show the ball element 60 as being connected with the inner member 58 by means of a shouldered stem 64 extending through the central openings of such member. The base 57 will be substantially rigidly connected with a support 65 and the socket element 61 connected with the radio 63, or other body to be supported, by means of the threaded stem 66 and nut. In the structure just described it will be noted that the center of the ball 60 of the friction coupling 55 is offset axially from the mid-plane of the resilient ring 56 and hence lateral movements or jarring of the body 63 tending to cause tilting of the ring 56, will also cause relative rocking between the ball and socket elements, especially at resonance frequencies of vibration. Because of the friction between the ball and socket elements and the rocking of the inner member 58 the vibrations or oscillations will be damped out to a considerable extent and excessive and destructive amplitudes avoided.

From the foregoing description and accompanying drawings it will now be readily understood that I have provided an improved vibration damping device of the kind embodying a resilient ring and in which reinforcing means is provided in certain portions of such ring that enable the same to form a stronger and more secure connection between the base and load-carrying members.

While I have illustrated and described my improved vibration damping devices in considerable detail, it will be understood, of course, that I do not wish to be correspondingly limited but regard my invention as including all changes and modifications coming within the spirit of the invention and the scope of the appended claims.

Having thus described by invention, I claim:

1. A flexible mounting device of the character described, comprising a ring formed of resilient material and having a central hollow stem and a thickened outer rim connected by an intervening annular web, a pair of substantially coaxially disposed inner and outer members flexibly connected by said ring and adapted for connection respectively with a pair of parts to be connected, said outer member comprising a hollow metal member having an annular web portion disposed around the perimeter of said rim and inturned annular flange portions embracing said rim, said inner member comprising a metal member having a sleeve portion extending through said hollow stem and provided at its ends with outturned annular flange portions which embrace the ends of said hollow stem, and non-metallic sheet fabric embodied in said hollow stem and said thickened outer rim so as to lie in the portions thereof which are embraced by said inner and outer members.

2. A vibration dampener comprising, a resilient rubber ring having coaxial inner and outer thickened annular rims integrally connected by an intervening annular web, a pair of substantially coaxial inner and outer metal members connected respectively with said inner and outer rims so that said members are flexibly connected with each other by said ring, one of said members having an annular recess therein in which one of said thickened rims is embraced and gripped, and sheet fabric material carried by said one of the rims and united thereto, said one rim being connected with said one member solely by the embracing grip of the latter thereon and said fabric material forming a reinforcing in said one rim by which the latter resists distortion and is prevented from being pulled out of said embracing grip during flexing of said rubber ring.

3. A vibration dampener comprising, a resilient rubber ring having a hollow central stem portion and a thickened outer rim portion surrounding said stem portion and integrally connected therewith by an intervening annular web, a pair of substantially coaxial inner and outer metal members flexibly connected by said rubber ring, said inner member having an outwardly opening annular recess in which said stem portion is embraced and gripped and said outer member having an inwardly opening annular recess in which said rim portion is embraced and gripped, and sheet fabric material carried by said stem and rim portions and united thereto, said stem and rim portions being connected with said inner and outer members solely by the embracing grip of the latter thereon and said fabric material forming a reinforcing in said stem and rim portions by which the latter resist distortion and are prevented from being pulled out of said embracing grip during flexing of said rubber ring.

4. A flexible mounting device comprising a pair of substantially coaxial inner and outer members, a resilient rubber ring flexibly connecting said members and having an annular web portion extending therebetween and lying substantially in a plane which is intersected at substantially right angles by the common axis of said members, and a universal joint formed by a pair of swivelly cooperating joint elements disposed substantially on said common axis and one of which joint elements is connected with said inner member, said outer member being adapted for connection with a support and the other of said joint elements being adapted for connection with a load to be supported, the annular web portion of said rubber ring having a flexibility to permit axial and tilting movement of said inner member in response to jarring of said load and said universal joint being subject to an oscillating flexing in a direction transversely to said common axis in response to said jarring so as to decrease the amplitude of movement of the load during the jarring.

5. A flexible mounting device comprising a pair of substantially coaxial inner and outer members, a resilient rubber ring flexibly connecting said members and having an annular web portion extending therebetween and lying substantially in a plane which is intersected at substantially right angles by the common axis of said members, and a pair of swivelly connected ball and socket joint elements located on said common axis and forming a universal joint and one of which elements is connected with said inner member, said outer member being adapted for connection with a support and the other of said joint elements being adapted for connection with a load to be supported, the annular web portion of said rubber ring having a flexibility to permit axial and tilting movement of said inner member in response to jarring of said load and said universal joint being subject to an oscillating flexing in a direction transversely to said common axis in response to said jarring so as to decrease the amplitude of movement of the load during the jarring, said universal joint having friction means therein acting to retard and dampen the transverse oscillating flexing thereof.

HAROLD A. STORCH.

REFERENCES CITED

The following references are of record in the file of this patent:

UNITED STATES PATENTS

| Number | Name | Date |
|---|---|---|
| 2,270,336 | Paulus | Jan. 20, 1942 |
| 2,260,996 | Kruezek | Oct. 28, 1941 |
| 1,834,450 | Flintermann | Dec. 1, 1931 |
| 1,961,745 | Eckhardt | June 5, 1934 |
| 2,018,860 | Lord | Oct. 29, 1935 |
| 2,179,469 | Germonprez | Nov. 7, 1939 |
| 2,229,398 | Thompson | Jan. 21, 1941 |
| 1,844,168 | Knapp | Feb. 9, 1932 |
| 2,126,707 | Schmidt | Aug. 16, 1938 |
| 2,241,139 | Julien et al | May 6, 1941 |
| 2,246,704 | Tyler et al | June 24, 1941 |
| 2,273,869 | Julien | Feb. 24, 1942 |
| 2,340,629 | Trier | Feb. 1, 1944 |
| 2,342,577 | Gehman | Feb. 22, 1944 |
| 1,978,940 | Guy | Oct. 30, 1934 |

FOREIGN PATENTS

| Number | Country | Date |
|---|---|---|
| 516,002 | Great Britain | Dec. 20, 1939 |
| 827,017 | France | Jan. 18, 1938 |